United States Patent
Bahl

(10) Patent No.: US 10,703,011 B1
(45) Date of Patent: Jul. 7, 2020

(54) METHODS OF MAKING ARTIFICIAL GEMSTONES USING SUBLIMATION PRINTING, AND ARTIFICIAL GEMSTONES MADE THEREWITH

(71) Applicant: Vision Gems Pvt. Ltd., Jaipur (IN)

(72) Inventor: Manoj Bahl, Jaipur (IN)

(73) Assignee: Vision Gems Pvt. Ltd., Jaipur (IN)

( * ) Notice: Subject to any disclaimer, the term of this patent is extended or adjusted under 35 U.S.C. 154(b) by 0 days.

(21) Appl. No.: 16/211,453

(22) Filed: Dec. 6, 2018

(51) Int. Cl.
| | |
|---|---|
| *B28B 1/00* | (2006.01) |
| *B41M 5/382* | (2006.01) |
| *B44C 1/16* | (2006.01) |
| *B32B 38/10* | (2006.01) |
| *B32B 38/00* | (2006.01) |
| *B32B 7/06* | (2019.01) |
| *B32B 38/14* | (2006.01) |
| *B44C 1/18* | (2006.01) |

(52) U.S. Cl.
CPC .............. *B28B 1/001* (2013.01); *B32B 38/10* (2013.01); *B32B 38/145* (2013.01); *B41M 5/382* (2013.01); *B44C 1/162* (2013.01); *B32B 7/06* (2013.01); *B32B 38/14* (2013.01); *B44C 1/18* (2013.01)

(58) Field of Classification Search
CPC .......... B28B 1/001; B41M 5/38; B44C 1/162; B44C 1/18; B32B 38/145; B32B 38/14; B32B 7/06; B32B 38/10
USPC ................................. 156/240, 247, 277, 387
See application file for complete search history.

(56) References Cited

U.S. PATENT DOCUMENTS

| 4,809,417 A | 3/1989 | Normann, Jr. |
| 5,474,970 A * | 12/1995 | Defieuw ................ B41M 5/035 |
| | | 428/206 |
| 6,197,428 B1 | 3/2001 | Rogers |

(Continued)

FOREIGN PATENT DOCUMENTS

| CN | 108439942 A | * | 8/2018 |
| KR | 20090076051 A | * | 7/2009 |
| KR | 101425550 B1 | * | 8/2014 |

OTHER PUBLICATIONS

English translation of KR101425550.*
Search Results by ASCR, Aug. 14, 2019 (Year: 2019).*
English translation of CN108439942.*

*Primary Examiner* — Sonya M Sengupta
(74) *Attorney, Agent, or Firm* — Downs Rachlin Martin PLLC

(57) ABSTRACT

Methods of making artificial gemstones that include providing a base body having a sublimation surface composed of a sublimatable material. A transfer print composed of one or more sublimation dye inks is received. The transfer print provides, for example, a translucent multicolor gradation pattern or a simulation of visual surface characteristics of a finished natural gemstone. The transfer print is contacted with the sublimation surface and pressure is provided between the print and the base body and heat is applied to the transfer print and base body for an amount of time sufficient for the transfer print to sublimate into the sublimation surface so as to create a sublimation print in the sublimatable material. Finishing steps may be performed after creating the sublimation print. The base body may be, for example, translucent or opaque and/or a component of a multiplet gemstone. Artificial gemstones having sublimation prints are also disclosed.

6 Claims, 5 Drawing Sheets

(56) References Cited

U.S. PATENT DOCUMENTS

| | | |
|---|---|---|
| 7,526,928 B1 | 5/2009 | Kearnes et al. |
| 8,365,553 B2 | 2/2013 | Huynh |
| 8,431,188 B2 | 4/2013 | Neogi et al. |
| 2005/0274144 A1 | 12/2005 | Goughnour et al. |
| 2015/0032528 A1* | 1/2015 | Will .................. G07F 17/26 |
| | | 705/14.27 |

* cited by examiner

METHODS OF MAKING ARTIFICIAL GEMSTONES USING SUBLIMATION PRINTING, AND ARTIFICIAL GEMSTONES MADE THEREWITH

FIELD OF THE INVENTION

The present invention generally relates to the field of artificial gemstones. In particular, the present invention is directed to methods of making artificial gemstones using sublimation printing, and artificial gemstones made therewith.

BACKGROUND

Fashion jewelry has become a big market in the recent years. People like to purchase jewelry just based on the extrinsic value, and many do not care if natural gemstones are used. Fashion jewelry is typically produced at very low cost using artificial gemstones, including both translucent gemstones (e.g., synthetics and/or simulants of diamond, ruby, emerald sapphire, topaz, and alexandrite, among many others) and opaque/semi-opaque gemstones (e.g., synthetics and/or simulants of turquoise, opal, jade, agate, tourmaline, and tiger's eye, among many others). Generally, simulated gemstones are less expensive than synthetic gemstones and are, therefore, preferred for low-cost fashion jewelry. However, the quality of simulated gemstones is usually not very good.

A process referred to as "multipletting" is often used in the fashion jewelry industry to produce doublets or triplets. In the context of making simulated translucent or transparent gemstones, the multipletting process generally includes coating a clear or translucent body with color and attaching it together with another clear or translucent body and subsequently manufacturing the bonded materials together as a gemstone. This gives the final product a colored-gemstone look, and the process can produce simulants less expensively than the cost of producing any of many natural gemstones.

The multipletting process can be performed on a variety of materials, including, but not limited to, glass, resin, quartz, topaz, etc. The process of bonding them together is also different for different manufacturers and includes, but is not limited to, UV-activated adhesives, heat and pressure-based adhesives, etc. To coat the clear material with color, different manufacturers use different material and techniques, which mostly include, but are not limited to, dyes and mixing different coloring with a clear chemical that can be sprayed over the clear or translucent substrate. The present technology of applying color between two or more clear or translucent bodies is restricted to a single color and plain patterns, which can be achieved by spraying a chemical coating. Moreover, the consistency of colors in conventional multipletting techniques is dependent on the quality of the sprayed coating, and a slight change in the process due to human error can change the colors considerably. This leads to simulated gemstones that lack consistency and, therefore, that lack quality.

Manufacturers produce simulants that imitate finished (e.g., shaped and polished) natural opaque and semi-opaque gemstones using various techniques. However, the look of these simulants is often not accurate relative to the finished natural gemstones they are trying to imitate. In addition, the quality is often poor.

SUMMARY OF THE DISCLOSURE

In one implementation, the present disclosure is directed to a method of making an artificial gemstone. The method includes providing a base body comprising a sublimation surface composed of a sublimatable material; receiving a transfer print composed of one or more sublimation dye inks printed onto a transfer substrate, wherein the transfer print either 1) provides a translucent multicolor gradation pattern or 2) simulates visual surface characteristics of a finished natural gemstone; contacting the transfer print to the sublimation surface; and applying pressure between, and heat to, the transfer print and the base body for an amount of time sufficient for the transfer print to sublimate into the sublimation surface so as to transfer the transfer print to the base body to create a sublimated print in the sublimatable material.

In another implementation, the present disclosure is directed to a method of making a translucent artificial gemstone. The method includes providing a base body comprising a sublimation surface composed of a sublimatable material; receiving a transfer print composed of one or more sublimation dye inks printed onto a transfer substrate, wherein the transfer print provides a translucent multicolor pattern; contacting the transfer print to the sublimation surface; applying pressure between, and heat to, the transfer print and the base body for an amount of time sufficient for the transfer print to sublimate into the sublimation surface so as to transfer the translucent multicolor pattern to the base body to create a translucent sublimated print in the sublimatable material; securing a translucent body to the base body so as to capture the translucent sublimated print between the translucent body and the base body so as to create a rough gemstone; and machining the rough gemstone to create a finished gemstone.

In still another implementation, the present disclosure is directed to a method of making an opaque artificial gemstone. The method includes providing a base body comprising a sublimation surface composed of a sublimatable material, wherein the artificial gemstone has a finished exterior shape; receiving a transfer print composed of one or more sublimation dye inks printed onto a transfer substrate, wherein the transfer print simulates visual surface characteristics of a finished natural gemstone; contacting the transfer print to the sublimation surface; and applying pressure between, and heat to, the transfer print and the base body for an amount of time sufficient for the transfer print to sublimate into the sublimation surface so as to transfer the transfer print to the base body to create a sublimated print in the sublimatable material, wherein the sublimated print provides the finished exterior shape with the visual surface characteristics of the finished natural gemstone.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
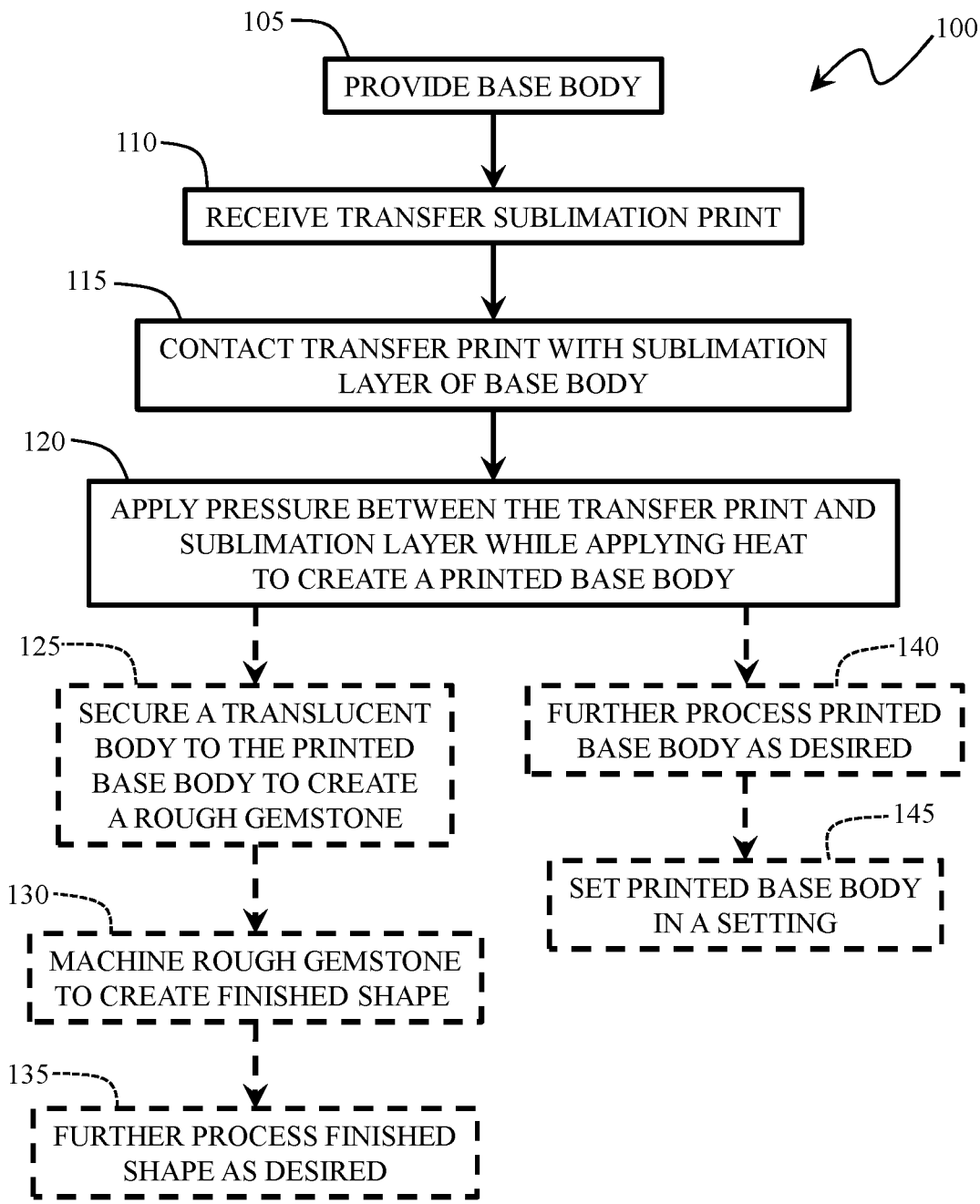
FIG. 1 is a flow diagram illustrating an example method of making an artificial gemstone using sublimation printing and additional steps that may be performed in connection with artificial translucent multiplet gemstones and artificial opaque gemstones.

In some aspects, the present disclosure is directed to methods of making artificial gemstones, including simulants of naturally occurring gemstones of both the translucent/transparent and opaque/semi-opaque types as well as contrived translucent/transparent gemstones. It is noted that the term "translucent" is used hereinafter and in the appended claims to denote both translucency and transparency, with translucency being a superset of transparency. Similarly, the term "opaque" is used hereinafter and in the appended claims to cover both opacity and semi-opacity, with opacity being a superset of semi-opacity. Examples of naturally occurring gemstones that disclosed methods can simulate include, but are not limited to: tourmaline, tanzanite, garnet, ruby, aquamarine, etc. in the transparent category; and larimar, banded agate, jaspers, malachite, chrysoprase, etc., in the opaque and semi-opaque category, among many others. As used herein and in the appended claims, the term "contrived gemstone" means an artificial gemstone that is not a simulant of a natural gemstone because the color(s) and/or pattern(s) of colors that the gemstone exhibits do not occur naturally. However, a contrived gemstone may have most any other characteristic of a finished natural or synthetic gemstone, such as shape, size, finish (e.g., faceted, polished, etc.), weight, etc. As will be understood from reading this entire disclosure, the examples of contrived translucent gemstones that can be made using disclosed methods are bounded virtually only by the imagination of a designer in selecting one or more colors and/or in creating one or more patterns of gradation of the selected colors. The term "artificial gemstone" is used herein and in the appended claims to denote any type of manmade gemstone and covers simulants of natural gemstones, contrived gemstones, and synthetic gemstones. In other aspects, the present disclosure is directed to the artificial gemstones created using any one or more of the methods disclosed herein.

At a high level, methods disclosed below use sublimation printing to impart a sublimated print into one or more surfaces of each artificial gemstone created. Sublimation printing is the application of one or more sublimation dye inks onto a sublimatable surface of an item using a heat press to provide the required combination of heat, time, and pressure. This combination causes the inks to be converted from a solid to a gaseous state, enabling them to penetrate the sublimatable surface so that a permanent, full color print is formed in the sublimatable material. The color penetrates the sublimatable surface of the item so that the result is a colorful, long-lasting print that is resistant to scratching, which is unlike other printing methods that merely print onto a surface of an item. Conventionally, sublimation printing is done on items coated with a sublimatable material, such as, but not limited to, polyester, polymer, or polymer-coated item. At an elevated temperature, elevated above room temperature, the solid dye converts into a gas without ever becoming a liquid. The same elevated temperature opens the pores of the sublimatable coating (polymer, etc.) and allows the gas to enter. When the temperature drops, the pores close and the gas within the pores of the sublimatable material reverts to a solid state, thereby imparting a sublimated print into the sublimatable material. This sublimation print results in the permanent change of color in the sublimatable coating.

Sublimation printing is a transfer printing process in which a print is first made on a temporary transfer substrate to create a transfer print. The printing of the transfer print is typically performed by a color inkjet printer configured to print with sublimation dye inks. Such printers and sublimation dye inks are well-known in the art and need not be described in any detail herein for those skilled in the art to practice the present methods to their fullest scope, since conventional sublimation printer and dye inks can be used in the disclosed methods. The temporary transfer substrate may be made of any suitable material(s), such as paper or plastic. As described below, using a plastic temporary transfer substrate may be desirable when the surface(s) to be printed with a sublimated print is/are not planar. The sublimation dye inks may be of a nature that results in either a translucent sublimated print (for either a translucent gemstone of an opaque gemstone) or opaque (for an opaque gemstone).

In the case of a translucent gemstone made in accordance with the present disclosure, such a gemstone comprises a multiplet composed of two or more translucent bodies bonded together, for example, using a transparent adhesive, to form the gemstone. In these gemstones, the sublimated print is translucent and is applied to one or more sublimatable surfaces that are captured between separate parts of the multiplet so that it is internal to the finished translucent gemstone. Typically, but not necessarily, each sublimatable surface for a translucent gemstone is planar for ease of manufacturing. In some embodiments, the multiple bodies are roughly shaped and form a rough gemstone when bonded together. The rough gemstone is then machined, for example, cut and/or polished, to form the finished gemstone. The machined gemstone may be coated as desired with one or more coatings, such as a scratch-resistant coating and/or one or more optical coatings.

In the case of an opaque gemstone made in accordance with the present disclosure, such a gemstone comprises a body that is preformed into the shape of the finished gemstone. This is so because the sublimated print is applied to the surface of the body and cannot be machined once applied. For opaque gemstones, the sublimated print can be opaque and/or translucent, depending on the color of the underlying body and the desired visual characteristics of the finished gemstone. Following sublimation printing, the opaque gemstone may be coated as desired with one or more coatings, such as a scratch-resistant coating or one or more optical coatings. Details of example methods of making both translucent gemstones and opaque gemstones are described below.

Figure 2B:
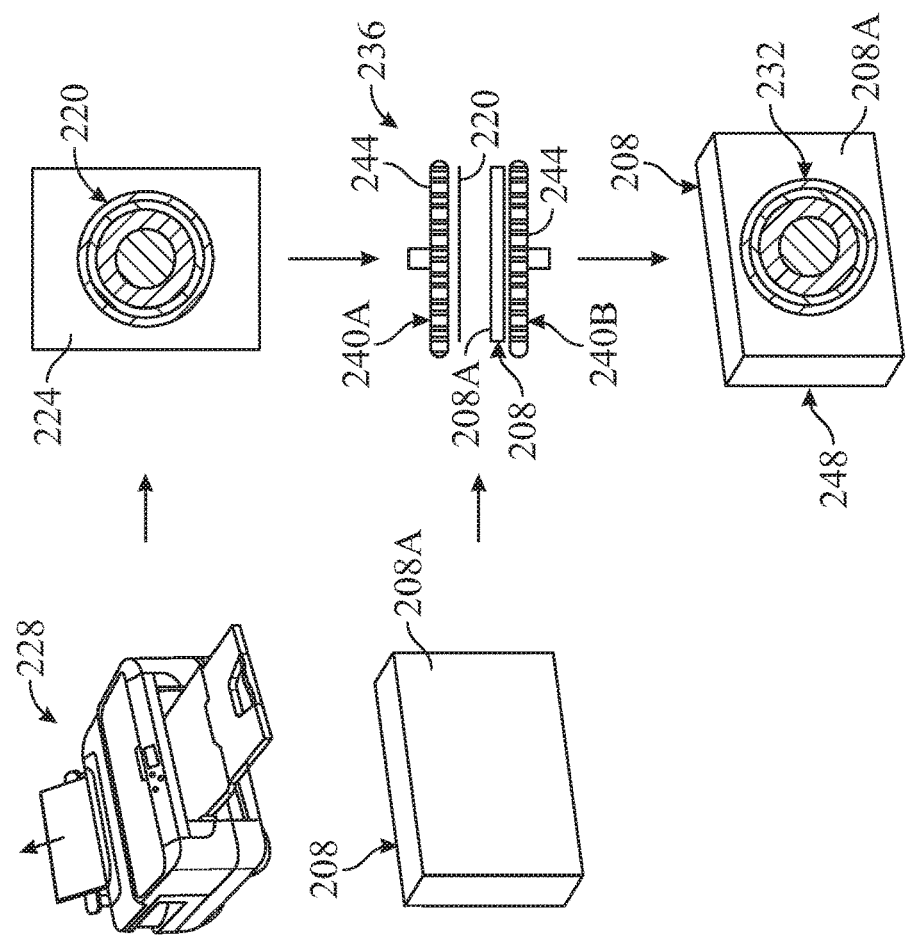
FIG. 2B is a diagram illustrating creating a transfer print composed of sublimation dye ink and transferring the transfer print to sublimatable layer of the base body of FIG. 2A.
Figure 2A:
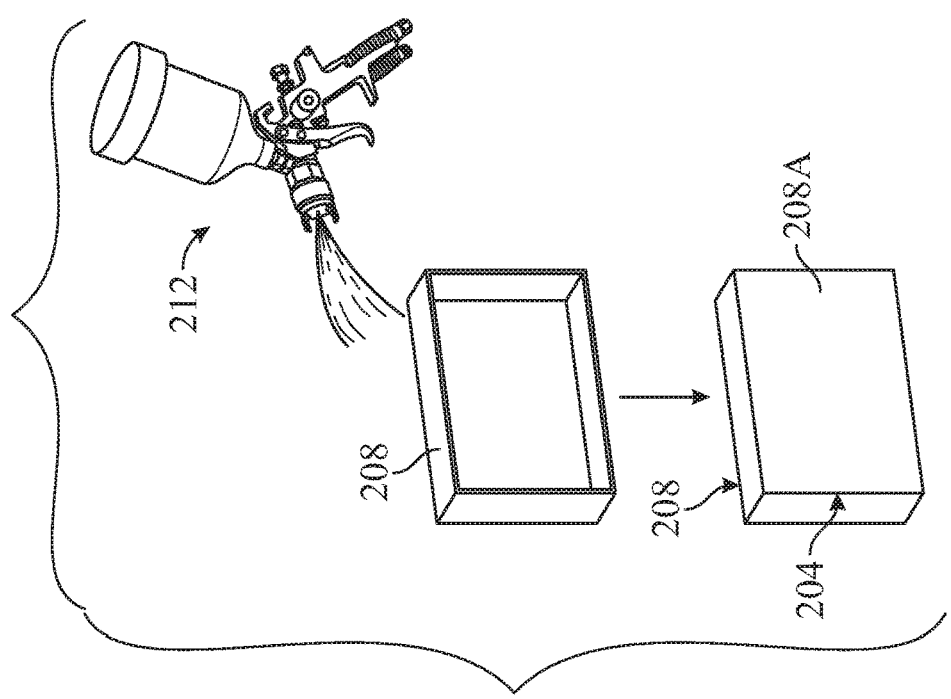
FIG. 2A is a diagram illustrating applying a sublimatable layer to a base body in connection with creating an artificial translucent gemstone of the present disclosure.
Figure 2C:
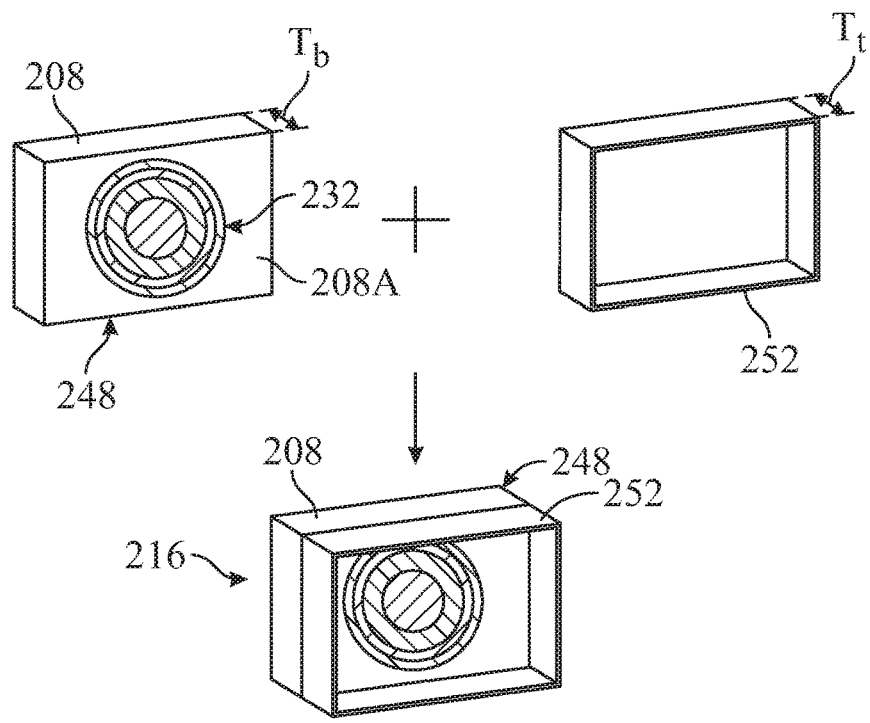
FIG. 2C is a diagram illustrating the securing of a translucent body to the base body of FIG. 2B to create a rough gemstone.

Turning now to the drawings, FIG. 1 illustrates an example method 100 of making an artificial gemstone in accordance with the present disclosure. As will be understood from reading this entire disclosure, method 100 can be used to make both translucent multiplet gemstones (both simulant and contrived types) and opaque gemstones, depending on any additional steps performed. Examples of at least some of such additional steps are described below and illustrated in the accompanying figures. For illustrative purposes, method 100 is described below in the context of FIGS. 2A to 2D and FIGS. 3A to 3C. FIGS. 2A to 2D illustrate steps in an example process of making a finished contrived translucent gemstone 200 (FIG. 2D), and FIGS. 3A to 3C illustrate steps in an example process of making a finished simulated opaque gemstone 300 (FIG. 3B).

Referring to FIG. 1, method 100 may begin at block 105 in which a base body is provided. The base body may be made of any one or more materials suitable for the intended use of the finished artificial gemstone. For example, in the context of making a translucent multiplet gemstone, the base body may be made of a transparent material, such as glass, quartz, plastic, topaz, and/or cubic zirconium, among many others. Fundamentally, any stable and suitably robust transparent material can be used for the bulk of the base body when making a translucent multiplet gemstone using method 100. In the context of making an opaque gemstone, the base body may be made of any one or more suitable materials, such as metal, plastic, glass, quartz, and/or granite, among many others. For creating an opaque gemstone, the base body may, but need not be, opaque, depending on the visual character of the base body material(s), the nature of any coating (if any) present on the base body, and the nature of the sublimated print that will be applied to the base body in a subsequent step.

Typically, though not necessarily, the base body is not made of a sublimatable material. In such cases, a layer of sublimatable material, such as any of the sublimatable materials noted above, is added to the base body at least on the surface(s) that will be sublimation printed. In the context of a translucent multiplet gemstone, an example process of adding a sublimatable layer 204 to a base body 208 is illustrated in FIG. 2A. In the example shown, sublimatable layer 204 is added to base body 208 using a sprayer 212 that applies the sublimatable layer as a spray coating. In other embodiments, sublimatable layer 204 may be added to base body 208 in another manner, such as by bonding a sublimatable film or sheet to the base body. Adding sublimatable layer 204 provides base body 208 with one or more sublimatable surfaces 208A that will be sublimation printed as described below. As noted above, in this example base body 208 is translucent (e.g., clear), and sublimatable layer 204 and any bonding agent that may be used to bond the sublimating layer to the base body will also be translucent (e.g., clear). Any suitable sublimatable material and application technique can be used to add sublimatable layer 204. Base body 208 in this example is rough, since finished contrived translucent gemstone 200 (FIG. 2D) is a faceted gemstone machined (here, faceted) from a rough gemstone 216 (FIG. 2C).

Figure 3B:
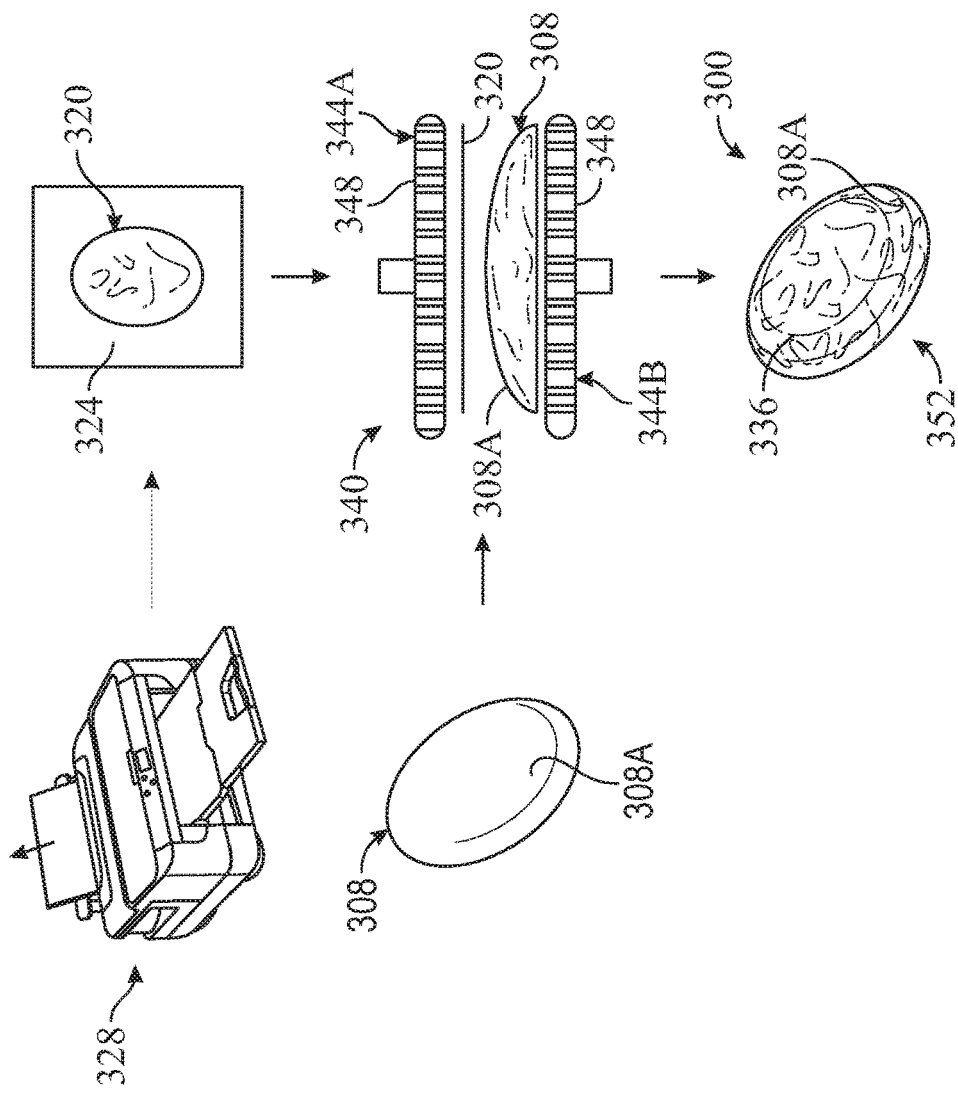
FIG. 3B is a diagram illustrating creating a transfer print composed of sublimation dye ink and transferring the transfer print to sublimatable layer of the base body of FIG. 3A to create an artificial opaque gemstone.
Figure 3A:
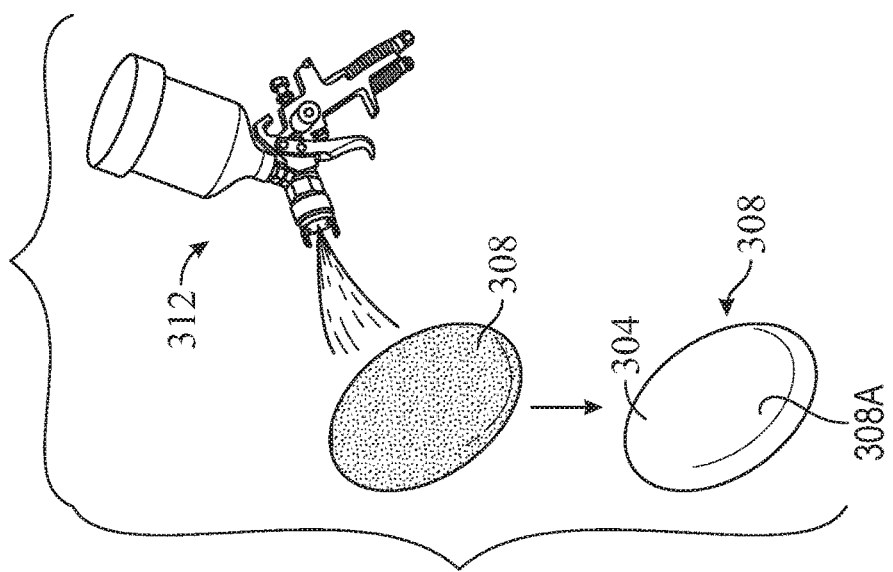
FIG. 3A is a diagram illustrating applying a sublimatable layer to a base body in connection with creating an artificial opaque gemstone of the present disclosure.

Similarly, FIG. 3A illustrates an example process of adding a sublimation layer 304 to a base body 308, but this time in the context of creating an opaque gemstone, particularly finished simulated opaque gemstone 300 (FIG. 3B). In the example shown, sublimatable layer 304 is added to base body 308 using a sprayer 312 that applies the sublimatable layer as a spray coating. In other embodiments, sublimatable layer 304 may be added to base body 308 in another manner, such as by vacuum-forming and bonding a sublimatable film or sheet to the base body. Adding sublimatable layer 304 provides base body 308 with one or more sublimatable surfaces 308A that will be sublimation printed as described below. As noted above, base body 308 and/or sublimatable layer 304 may be opaque or translucent, depending on the desired visual effect of finished simulated opaque gemstone 300 (FIG. 3B) and the manner in which that effect is achieved with the combination of colors and opacities of the sublimation printing, base body 308, and sublimatable layer 304. It is noted that if sublimatable layer 304 is opaque, the color and transparency of base body 308 may be any color and transparency desired. In one example, base body is made of metal, but finished simulated opaque gemstone 300 (FIG. 3B) is blue and white. In this example, a white sublimating layer 304 is used, along with a blue and white sublimation print having the desired pattern. Any suitable sublimatable material and application technique can be used to add sublimatable layer 304. The shape of base body 308 is the shape of finished simulated opaque gemstone 300 (FIG. 3B), because once the base body is sublimation printed, it cannot be further shaped.

In both examples of FIGS. 2A and 3A, the sublimatable layer 204, 304 is added to the respective base body 208, 308 because the initial base body is made of a non-sublimatable material. However, in some embodiments, each of base bodies 208 and 308 can be made entirely of a sublimatable material such that a separate layer of sublimatable material need not be applied. If base body 208, 308 is made entirely of a sublimatable material but that sublimatable material is not robust enough to avoid damage (e.g., scratching) in the corresponding finished gemstone 200, 300 (FIGS. 2D and 3C, respectively), one or more protective coatings (not shown) can be applied at an appropriate time.

Referring again to FIG. 1, at block 110 a transfer print is received for use in the sublimation printing process. The character of the transfer print will vary depending on whether the gemstone being created is a translucent multiplet gemstone or an opaque gemstone as discussed above. FIGS. 2B and 3B illustrate both the making of transfer prints and the receiving of the transfer prints for use.

Figure 2D:
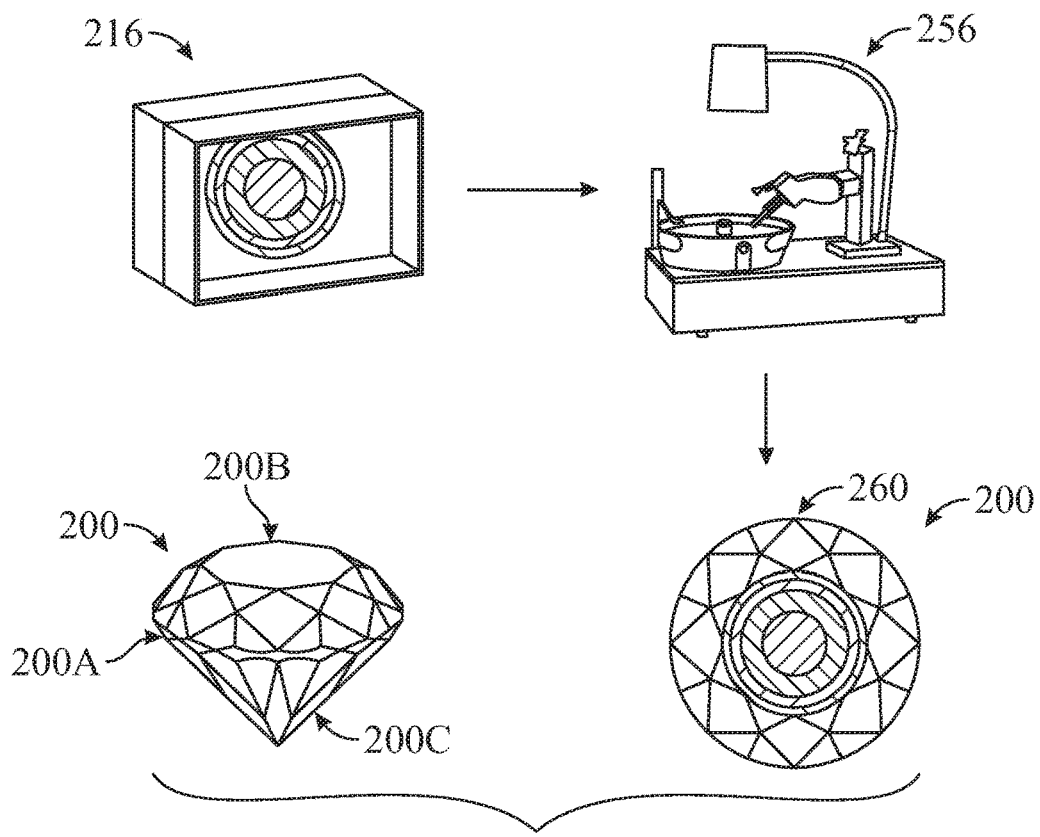
FIG. 2D is a diagram illustrating a finished artificial translucent gemstone made from the rough gemstone of FIG. 2C.
Figure 3C:
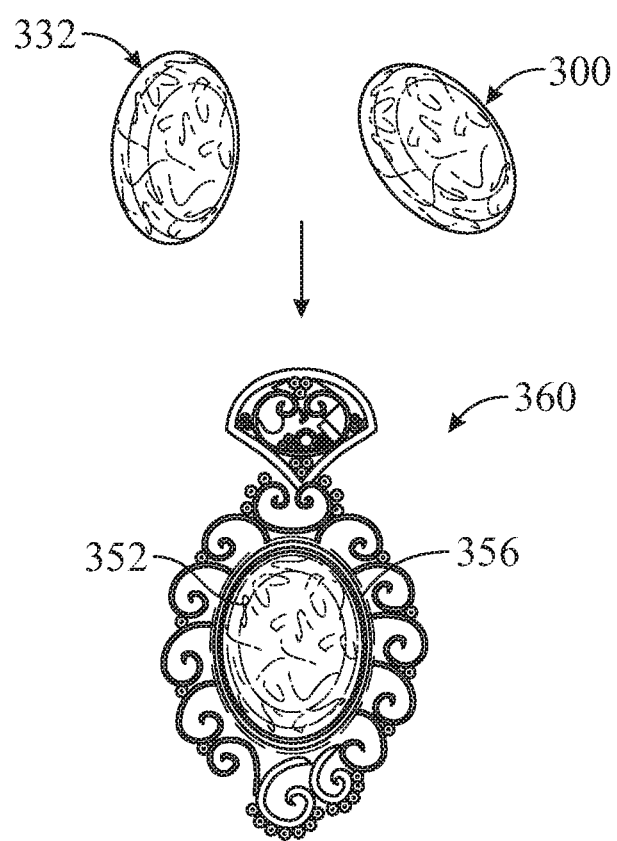
FIG. 3C is a diagram illustrating a natural opaque gemstone next to the artificial opaque gemstone of FIG. 3B, along with the artificial opaque gemstone of FIG. 3B set into a setting.

Referring first to FIG. 2B, this figure illustrates an example of creating a transfer print 220 for making a translucent multiplet gemstone, here finished contrived translucent gemstone 200 (FIG. 2D). Transfer print 220 is printed onto a suitable temporary transfer substrate 224, here, using an inkjet printer 228. As noted above, inkjet printers for printing sublimation dye inks onto substrates are well known in other arts. As also noted above, substrate 224 may be any suitable substrate, such as paper or plastic film/sheet, among others. Here, transfer print 220 is composed of multiple colors gradated with one another in a radial direction to form a multicolor bullseye pattern of sorts. In FIG. 2B, the differing hatching indicate corresponding respective differing colors, and gradations therebetween can be envisioned to be occurring at the solid lines between adjacent regions and for a relatively small distance from the solid lines as the ratio of one color to another color diminishes away from each solid line. The sublimation dye inks used to create transfer print 220 are of a nature that the sublimated print 232 imparted into sublimatable layer 204 at sublimation surface 208A is translucent to allow light to pass through to provide the stunning visual effects to finished contrived translucent gemstone 200 (FIG. 2D). Those skilled in the art will readily appreciate that transfer print 220 shown in FIG. 2B is merely one example and that each of the shape, size, configuration, color composition, etc. of the gradation pattern provided can be changed at the desire of a designer. Those skilled in the art will readily appreciate that the image used to create transfer print 220 can be created using any suitable means, such as one or more software applications with drawing, painting, and/or imaging functionality, along with printing functionality.

Referring next to FIG. 3B, this figure illustrates an example of creating a transfer print 320 for making an opaque gemstone, here finished opaque gemstone 300. Transfer print 320 is printed onto a suitable temporary transfer substrate 324, for example, using an inkjet printer 328. As noted above, inkjet printers for printing sublimation dye inks onto substrates are well known in other arts. As also noted above, substrate 324 may be any suitable substrate, such as paper or plastic film/sheet, among others. Because the shape of base body 308 is in the shape of finished opaque gemstone 300, and because that shape will often be non-planar (e.g., 3-dimensionally curved), using a plastic that can be applied conformally to the required shape may be desirable. For example, a plastic that can be softened by heating so as to be conformally vacuum-formed onto base body 308 can be used.

In this example, transfer print 320 is a print of a photograph of visual surface characteristics of a finished natural gemstone 332 (FIG. 3C) that finished opaquest gemstone 300 (FIGS. 3B and 3C) is designed to imitate. The sublimation dye inks used to create transfer print 320 are of a nature that the sublimated print 336 imparted into sublimatable layer 304 at sublimation surface 308A is of such a nature, and is coordinated with the opacity of base body 308, to replicate the visual surface characteristics of finished natural gemstone 332 (FIG. 3C) on finished opaque gemstone 300. Those skilled in the art will readily appreciate that transfer print 320 shown in FIG. 3B is merely one example and that the image used for creating the transfer print can be changed at the desire of a designer depending on the finished natural gemstone that the designer is imitating. Those skilled in the art will readily appreciate that the image used to create transfer print 320 can be created using any suitable means, such as a digital imaging system that can capture an image of visual surface characteristics of a gemstone that is desired to be imitated, process the image, if needed, and print the image as a transfer print, such as transfer print 320. In other embodiments, the image for transfer print 320 can be produced in another manner, such as using one or more suitable drawing and/or painting software applications.

Referring back to FIG. 1, at block 115, the transfer print is contacted with sublimatable surface of the base body, and at block 120 pressure is applied between the transfer print and the base body while heat is also applied to heat the sublimation dye ink(s). The heating causes the sublimation dye ink(s) to sublimate to gas and pores in the sublimatable surface(s) to open so that the gas can enter the pores so that the transfer print becomes a sublimated print within the sublimation material of the base body. Sublimation printing techniques are well known in other art, and the same or similar techniques can be used for transferring the transfer print into the sublimatable surface. For example, a device that includes both a press and a heater can be used to provide the pressure and heat for an amount of time suitable for the sublimatable dye ink(s) to sublimate and enter into the pores of the sublimatable surface(s). Following heating, sublimation, and print transfer, the base body is permitted to cool, which causes the pores in the sublimatable surface(s) that opened from the heat to close to trap the sublimated dye ink(s) therein and the gaseous sublimated dye ink(s) to solidify. The base body, which now includes the sublimated print, is now ready for any further processing.

FIG. 2B generally illustrates operations performed at blocks 115 and 120 in the context of creating finished translucent multiplet gemstone 200 (FIG. 2D). Specifically, FIG. 2B shows base body 208 and transfer print 220 located in a sublimation heat-press 236 configured to apply heat and pressure between the transfer print and the base body for a time sufficient to impart sublimated print 232 into sublimatable surface(s) 208A of the base body. Sublimation heat-press 236 is shown with a pair of platens 240A and 240B in an open position for ease of illustrating transfer print 220 and base body 208 between the platens. During the sublimation printing, platens 240A and 240B compress transfer print 220 and base body 208 together to create the necessary pressure, and one or more heating elements, here heating elements 244, provide the necessary heat to transfer the transfer print into the base body by sublimation to create sublimated print 232. FIG. 2B also illustrates the printed base body 248 that results after the sublimation printing.

Similarly, FIG. 3B generally illustrates operations performed at blocks 115 and 120 in the context of creating finished opaque gemstone 300. Specifically, FIG. 3B shows base body 308 and transfer print 320 located in a sublimation heat-press 340 configured to apply heat and pressure between the transfer print and the base body for a time sufficient to impart sublimated print 336 into sublimatable surface(s) 308A of the base body. Sublimation hot-press 340 is shown with a pair of platens 344A and 344B in an open position for ease of illustrating transfer print 320 and base body 308 between the platens. During the sublimation printing, platens 344A and 344B compress transfer print 320 and base body 308 together to create the necessary pressure, and one or more heating elements, here heating elements 348, provide the necessary heat. FIG. 3B also illustrates the printed base body 352 that results after the sublimation printing. If no further processing is desired, printed base body 352 can be used as finished opaque gemstone 300. However, as noted above, one or more additional coatings (not shown) can be provided to printed base body 352 as desired. Not illustrated in detail are the facts that one or both platens 344A and 344B can be shaped to conform to one or more of sublimatable surfaces 308A of base body 308 (or more than one base body if multiple-based bodies are sublimation printed simultaneously with one another) and that sublimation hot-press 340 may include vacuum-forming functionality to assist in making transfer print 320 conform to base body 308.

Blocks 105 to 120 of example method 100 of FIG. 1 illustrate operations and aspects that can be performed when creating either of finished translucent multiplet gemstone 200 (FIG. 2D) and finished opaque gemstone 300 (FIG. 3D). However, additional processing steps can be performed. For example, for creating example finished translucent multiplet gemstone 200 (FIG. 2D), as illustrated in FIG. 2C, an additional step, at block 125 of FIG. 1, includes securing a translucent body 252 to printed base body 248 to create a rough gemstone 216. Translucent body 252 may be made of any suitable material(s) and is often the same material as base body 208. Typically, translucent body 252 is bonded to printed base body 248 on sublimatable surface 208A so that sublimated print 232 is internal to rough gemstone 216. Translucent body 252 is typically secured to base body 208 using a translucent (e.g., clear) bonding agent (e.g., adhesive) so that rough gemstone 216 is comprised of completely translucent materials. In some instantiations, the thicknesses $T_b$ and $T_t$, respectively, of printed base body 248 and translucent body 252 are selected so that sublimated print 232 will be located in a girdle section 200A (FIG. 2D) of finished translucent gemstone 200 of FIG. 2D after machining of rough gemstone 216.

Following the creation of rough gemstone 216 at block 125, at block 130 (FIG. 1) the rough gemstone is machined to create the final shape of finished translucent gemstone 200 (FIG. 2D). In the example of FIGS. 2A to 2D, finished translucent gemstone 200 (FIG. 2D) is a faceted gemstone having a crown 200B, girdle region 200A, and a pavilion 200C created, in this example, using a faceting machine 256 and/or other lapidary equipment. Also in this example, rough gemstone 216 is faceted so that sublimated print 232 is located in the girdle region. View 260 is a top-down view toward crown 200B, showing sublimated print 232 visible through the translucent material of crown 200B, which in this example is formed from base body 208, with pavilion 200C being formed from translucent body 252. Although not seen, the seam between crown 200B and pavilion 200C, where translucent body 252 was secured to base body 208, is present in girdle region 200A so that any visual impact that the presence of the seam may have when viewing finished translucent gemstone 200 when set into a piece of jewelry (not shown) or other object (not shown) is minimized. As those skilled in the art will readily appreciate, finished translucent gemstone 200 can be used in the same or similar manner as natural gemstones, simulant gemstones, synthetic gemstones, and the like. In addition, those skilled in the art will readily appreciate that rough gemstone 216 can be cut in any of many other faceted configurations and/or can be shaped and finished in any of a variety of ways other than faceting. As noted above, finished translucent gemstone 200 may be further processed at block 135, for example, to add one or more coatings for durability and/or for enhancing optical qualities of the finished translucent gemstone.

As mentioned above, printed base body 352 can be used without any further processing such that it is finished opaque gemstone 300. However, similar to finished translucent gemstone 200 (FIG. 2D), printed base body 352 may be further processed at block 140, for example, to add one or more coatings for durability and/or for enhancing optical qualities of finished opaque gemstone 300. As shown in FIG. 3C relative to finished opaque gemstone 300, at block 145 the finished opaque gemstone can be set in a setting 356 in the same or similar manner as the corresponding finished natural gemstone 332 to create a piece of jewelry 360 that is, visually, virtually identical to jewelry made using the finished natural gemstone.

Example Benefits of Sublimation Printing for Artificial Gemstones

Benefits of the disclosed sublimation printing for finished translucent gemstones, such as finished translucent gemstone 200 of FIG. 2D, include the following:

As noted in the Background section above, current methods of creating colored artificial translucent gemstones are generally restricted to a single color and simple patterns that can be achieved by spraying a chemical, and the consistency of the resulting artificial gemstones across multiple similar gemstones can vary significantly due to even slight human error in the application process. In addition, the applied color can be damaged during handling before further processing is performed.

In contrast, the sublimation printing process of the present disclosure can provide a sublimated print having any desired number of colors, color combinations, and color gradations, and virtually any pattern that can be drawn or painted in a software application or imaged from another source. Highly accurate color sublimation dye inkjet printers that print using cyan, magenta, and yellow or cyan, magenta, yellow, and key (black) color models are well-known in other fields, and these printers can be used in the sublimation printing process disclosed.

The sublimation printing process of the present disclosure also provides high consistency from one finished transparent gemstone to another. As noted above, sublimation printers and print-transfer techniques are highly evolved in other fields, such as creating custom coffee mugs, that provide very high levels of consistency from one printed object to another. Since the same printers and similar print-transfer techniques can be used in the sublimation printing processes described herein, similar very high levels of consistency from one gemstone to another is routinely achieved. Regarding damage during subsequent handling, because the sublimated images are captured within the sublimatable material, and because the sublimatable material is quite durable and robust, it is relatively difficult to damage the sublimated print once the sublimatable material has sufficiently cooled.

Benefits of the disclosed sublimation printing for finished opaque gemstones, such as finished opaque gemstone 300 of FIG. 3C, include the following:

Because the sublimated print imparted into the finished opaque gemstone is based on a photograph or high-quality artistic rendering of a natural gemstone, very visually high-quality imitations of natural gemstones can be created at a low cost. In addition, finished opaque gemstones made in accordance with the present disclosure are better for the environment, as less mining is needed and eco-friendly stones and metals can be used for the base bodies instead of natural stones, which are hard to mine.

Finished opaque gemstones made in accordance with the present disclosure result in fashion jewelry that is of better quality than current opaque-stone-based fashion jewelry. Present imitations are not of very high quality, as most of manufacturers use plastic or glass, which do not weigh as much as natural stones. By using stones or metal, the quality, from a weight perspective, is improved. Relatedly, when a cheap stone, such as agate, or a cheap metal, such as brass, is used for the base body, a process of creating a finished opaque gemstone therefrom can greatly increase the extrinsic value of such material.

The processes disclosed herein for making finished opaque gemstones can be used to make imitations of natural gemstones that are almost impossible to find. All that is needed for the imitation is a photograph or high-quality artistic rendering of a finished natural gemstone.

In view of the foregoing, aspects of the present disclosure include:

A first artificial gemstone, comprising: a base body comprising a sublimation surface composed of a sublimatable material; and a sublimated print printed into the sublimatable material through the sublimation surface, wherein the sublimation print either 1) provides a translucent multicolor gradation pattern in the sublimatable material or 2) simulates, on the sublimation surface, visual surface characteristics of a finished natural gemstone.

A second artificial gemstone similar to the first artificial gemstone, wherein the base body is translucent and the sublimated print comprises the translucent multicolor gradation pattern, the artificial gemstone further comprising a translucent body secured to the base body so that the translucent multicolor gradation pattern is captured between the translucent body and the base body.

A third artificial gemstone similar to the second artificial gemstone, wherein an act of securing the translucent body to the base body created a rough gemstone, and the artificial gemstone has a machined exterior surface created by machining the rough gemstone.

A fourth artificial gemstone similar to the third artificial gemstone, wherein the machined exterior surface comprises a plurality of facets.

A fifth artificial gemstone similar to the fourth artificial gemstone, wherein the artificial gemstone has a faceted crown and a faceted pavilion.

A sixth artificial gemstone similar to the fifth artificial gemstone, wherein the artificial gemstone has a girdle region, and the translucent multicolor gradation pattern is contained in the girdle region.

A seventh artificial gemstone similar to the second artificial gemstone, wherein the translucent multicolor gradation pattern comprises at least three colors gradated with one another.

An eighth artificial gemstone similar to the second artificial gemstone, wherein the translucent multicolor gradation pattern comprises at least five colors gradated with one another.

A ninth artificial gemstone similar to the second artificial gemstone, wherein the base body consists essentially of the sublimatable material.

A tenth artificial gemstone similar to the second artificial gemstone, wherein the base body comprises a layer of the sublimatable material, applied to a non-sublimatable material, that provides the sublimation surface.

An eleventh artificial gemstone similar to the first artificial gemstone, wherein: the sublimation surface has a finished exterior shape prior to application of the sublimated print; and the sublimated print provides the finished exterior shape with the visual surface characteristics of the finished natural gemstone.

A twelfth artificial gemstone similar to the eleventh artificial gemstone, wherein the base body consists essentially of the sublimatable material.

A thirteenth artificial gemstone similar to the twelfth artificial gemstone, wherein the sublimatable material is opaque.

A fourteenth artificial gemstone similar to the eleventh artificial gemstone, wherein the base body comprises a layer of the sublimatable material, applied to a non-sublimatable material, that provides the sublimation surface.

A fifteenth artificial gemstone similar to the twelfth artificial gemstone, wherein the layer is opaque.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of making an artificial gemstone, the method comprising:
   providing a base body comprising a sublimation surface composed of a sublimatable material;
   receiving a transfer print composed of one or more sublimation dye inks printed onto a transfer substrate, wherein the transfer print either 1) provides a translucent multicolor gradation pattern or 2) simulates visual surface characteristics of a finished natural gemstone;
   contacting the transfer print to the sublimation surface; and
   applying pressure between, and heat to, the transfer print and the base body for an amount of time sufficient for the transfer print to sublimate into the sublimation surface so as to transfer the transfer print to the base body to create a sublimated print in the sublimatable material;
   wherein the base body consists essentially of the sublimatable material.

2. The method according to claim 1, wherein:
   the artificial gemstone has a finished exterior shape;
   the providing of the base body includes providing the sublimation surface with the finished exterior shape;
   the transfer print simulates visual surface characteristics of a finished natural gemstone; and
   the sublimated print provides the finished exterior shape with the visual surface characteristics of the finished natural gemstone.

3. The method according to claim 1, wherein the sublimatable material is opaque.

4. The method according to claim 2, further comprising:
   photographing an exterior region of the finished natural gemstone to obtain an image of the visual surface characteristics; and
   printing at least a portion of the image on the transfer substrate to create the transfer print.

5. A method of making an opaque artificial gemstone, the method comprising:
   providing a base body consisting essentially of a substitutable material comprising a sublimation surface, wherein the artificial gemstone has a finished exterior shape;
   receiving a transfer print composed of one or more sublimation dye inks printed onto a transfer substrate, wherein the transfer print simulates visual surface characteristics of a finished natural gemstone;
   contacting the transfer print to the sublimation surface; and applying pressure between, and heat to, the transfer print and the base body for an amount of time sufficient for the transfer print to sublimate into the sublimation surface so as to transfer the transfer print to the base body to create a sublimated print in the sublimatable material, wherein the sublimated print provides the finished exterior shape with the visual surface characteristics of the finished natural gemstone.

6. The method according to claim 5, further comprising:

photographing an exterior region of the finished natural gemstone to obtain an image of the visual surface characteristics; and printing at least a portion of the image on the transfer substrate to create the transfer print.

* * * * *

UNITED STATES PATENT AND TRADEMARK OFFICE
CERTIFICATE OF CORRECTION

PATENT NO. : 10,703,011 B1
APPLICATION NO. : 16/211453
DATED : July 7, 2020
INVENTOR(S) : Manoj Bahl Page 1 of 1

It is certified that error appears in the above-identified patent and that said Letters Patent is hereby corrected as shown below:

In the Claims

Column 12, Lines 58-59, Claim 5, the word "substitutable" should be replaced with the word "sublimatable".

Signed and Sealed this
Third Day of November, 2020

Andrei Iancu
*Director of the United States Patent and Trademark Office*